Patented May 20, 1924.                                                1,495,138

UNITED STATES PATENT OFFICE.

JOSEPH DOWNES, OF SIOUX CITY, IOWA.

HARDENING AND BONDING COMPOSITION ADAPTED FOR THE TREATMENT OF CONCRETE AND CEMENT.

No Drawing.         Application filed January 30, 1922.   Serial No. 532,850.

*To all whom it may concern:*

Be it known that I, JOSEPH DOWNES, a citizen of the United States, and a resident of Sioux City, in the county of Woodbury and State of Iowa, have invented a new and useful Improvement in a Hardening and Bonding Composition Adapted for the Treatment of Concrete and Cement, of which the following is a specification.

My invention relates to a composition of matter suitable for the treatment of concrete. More particularly, it is adapted to increase the strength of the concrete and act as a bond when it is desired to add a new concrete surface to an old one.

My composition of matter comprises the following substances:

(1) A saline concentrate derived from the saline lakes of the West, in which potassium chloride is present in a substantial quantity. Typical analyses of saline waters are as follows:

|  | Searles Lake. | Owens Lake. |
|---|---|---|
| $Na_2CO_3$ | 4.16 | 8.50 |
| $Na_2SO_4$ | 6.60 | 3.02 |
| $NaCl$ | 7.20 | 9.06 |
| $KCl$ | 4.00 | 9.00 |
| $Na_2B_4O_7$ | 1.03 | 3.60 |
| $H_2O$ | 77.07 | 69.92 |

Waters containing substances of this character are concentrated by any suitable means and the residuum thereof burned in a cement kiln to produce a saline concentrate which on solution in an appropriate amount of water forms a brine; (2) magnesium fluosilicate, (3) calcium chloride, (4) magnesium chloride, (5) alum, (6) zinc sulfate, (7) barium sulfate, (8) iron oxide.

As an example of the proportions in which the above substances are combined the following is given, but it is understood the proportions may be somewhat varied: 300 pounds of saline concentrate is dissolved in water to 30° Bé., thereby forming a brine containing some solids which are removed by filtration. Solutions of the remaining constituents are prepared as follows: 30 pounds of calcium chloride in hot water to a 10° Bé. solution, 20 pounds of magnesium chloride in cold water to a 10° Bé. solution, 10 pounds of alum in three gallons of boiling water, and five pounds of zinc sulfate in three gallons of hot water. When these solutions are mixed, five pounds each of barium sulfate and iron oxide are added, the preparation being diluted, if not sufficiently thin.

The constituents are blended into a single composition of matter as follows: The saline concentrate after it has been dissolved to a brine is introduced into a mixing tank and thereafter run through a sand filter whereby the solids are removed, the liquid being run into a filter tank. The purified saline concentrate and the remaining constituents are then introduced into a mixing tank where they are thoroughly blended, after which they are passed through the sand filter and then to a suitable receiving tank. The whole mass is again introduced into the mixing tank containing cinders and run through a felt bag filter. As the result of this treatment the entire composition will be in the form of a clear solution thoroughly blended and ready for immediate use to harden concrete and for bonding a new concrete surface to an old concrete surface.

My composition of matter has been used in concrete paving streets, sidewalks, walks and building floors. Tests upon the same show that the material increases the strength of the concrete. Some of the tests show that the strength of the concrete had been increased 30% over that of the standard mixture. Concrete prepared with my composition of matter is oil-proof, water-proof and substantially acid-proof. The freezing point of the concrete is also so reduced that it is possible to proceed with the placing of concrete during cold weather. When my composition of matter is integrally applied to the concrete it fills the concrete pores or capillaries with a film or coating which makes the concrete substantially non-porous.

As heretofore stated, my composition of matter is especially valuable for bonding a new concrete surface to a worn or old concrete base. Experiments have shown that my composition of matter penetrates the concrete to a depth of at least one-quarter of an inch, thereby forming a very strong bond. When it is desired to bond a new concrete surface to an old one the base is cleaned with a suitable acid solution appropriately diluted, for example, nitric acid, hydrochloric acid or sulphuric acid. The surface is then flushed with clean water and a suitable amount of the undiluted composition of matter applied thereto. The composition of matter may be applied by a plastering brush or by means of a small sprinkling can. The bottom concrete surface, treated as described, is ready to receive the top-mixture. The top-mixture is mixed with a dilute solution of my composition of matter, preferably one part of the same to 10 parts of water. It has been found that concrete bonded with my composition of matter in the manner described furnishes a thorough and efficient bond, without the use of any neat cement or grouting, and penetrates the concrete base to at least a depth of one-quarter of an inch. My composition of matter may be applied as a finishing agent to a concrete surface to give it a high polish. It may be applied to the final troweling mixture by sprinkling thereon a suitable amount of the undiluted substance. After the troweling has been continued until the composition of matter is absorbed in the cement surface, the latter, in appearance, resembles highly polished marble.

My composition of matter, suitably diluted, is adapted for use in "stucco work." The "stucco work" is to be done in the usual fashion, two coats of cement and sand mortar. After the scratch coat has been applied to the laths, and the former allowed to dry over night, it is essential that the scratch coat be treated with a suitable quantity of my undiluted composition of matter before the application of the final coat and the stone dash or granite chips which are to be applied to the finish-coating, while the latter is in a plastic condition. The composition of matter is preferably applied to the finish-coating by spraying.

Cement floors may be treated with my composition of matter by dissolving one part of the same in five parts of water. The composition may be applied by simply flushing it on the surface of the cement floors. The composition dries after about thirty minutes penetrating the concrete pores and forming a water, oil and acid-proof surface, thereby preventing disintegration and greatly prolonging the life of the cement floor.

In reduction to practice, I have found that the composition necessary in the carrying of my invention into effect and referred to in the above description is the most effective. Yet realizing that the conditions concurrent with the carrying of my invention into use will necessarily vary, I desire to emphasize the fact that certain modifications and changes in the elements and steps may be executed when necessary without sacrificing any of the advantages of my invention as defined in the appended claims.

I claim—

1. A hardening and bonding composition adapted for the treatment of concrete and cement comprising the reaction-products resulting from a mixture of a saline concentrate, magnesium fluosilicate, calcium chloride, magnesium chloride, alum, zinc sulfate, barium sulfate and iron oxide, the saline concentrate being present in the mixture in a predominating amount and the remainder of the constituents in amounts greater than traces.

2. A hardening and bonding composition adapted for the treatment of concrete and cement comprising the reaction-products resulting from a mixture of a saline concentrate from which the solids have been removed, magnesium fluosilicate, calcium chloride, magnesium chloride, alum, zinc sulfate, barium sulfate, and iron oxide, the saline concentrate being present in the mixture in a predominating amount and the remainder of the constituents in amounts greater than traces.

3. A hardening and bonding composition adapted for the treatment of concrete and cement comprising the reaction-products resulting from a mixture of a saline concentrate containing a substantial portion of potassium salts, magnesium fluosilicate, calcium chloride, magnesium chloride, alum, zinc sulfate, barium sulfate and iron oxide, the saline concentrate being present in the mixture in a predominating amount and the remainder of the constituents in amounts greater than traces.

JOSEPH DOWNES.